United States Patent

Koga et al.

[11] Patent Number: 5,211,066
[45] Date of Patent: May 18, 1993

[54] CAM GEAR CONTROLLING MECHANISM

[75] Inventors: Noriyuki Koga, Chiba; Jun Ishikawa, Tokyo, both of Japan

[73] Assignee: Sony Corporation, Tokyo, Japan

[21] Appl. No.: 790,546

[22] Filed: Nov. 12, 1991

[30] Foreign Application Priority Data

Nov. 13, 1990 [JP] Japan ................................ 2-306770
Nov. 14, 1990 [JP] Japan ................................ 2-308163
Nov. 15, 1990 [JP] Japan ................................ 2-309951

[51] Int. Cl.$^5$ .................... F16H 29/00; F16H 55/17
[52] U.S. Cl. .................................... 74/122; 74/435; 74/567; 242/200; 360/96.3
[58] Field of Search ............... 74/113, 122, 435, 526, 74/527; 242/198, 200, 204; 360/96.3

[56] References Cited

U.S. PATENT DOCUMENTS

| | | | |
|---|---|---|---|
| 4,215,588 | 8/1980 | Komori et al. | 74/122 X |
| 4,347,919 | 9/1982 | Maeda | 74/435 X |
| 4,630,152 | 12/1986 | Kilstofte | 74/435 X |
| 4,720,755 | 1/1988 | Kamijo | 360/96.3 |
| 4,785,362 | 11/1988 | Nozawa et al. | 74/435 X |

Primary Examiner—Allan D. Herrmann
Assistant Examiner—David W. Laub
Attorney, Agent, or Firm—Lewis H. Eslinger; Jay H. Maioli

[57] ABSTRACT

A cam gear controlling mechanism is simple in structure, small in overall size and high in reliability of operation. The controlling mechanism comprises a cam gear having toothed and non-toothed portions and a cam groove, a trigger lever having a projection fitted in the cam groove and movable between arresting and non-arresting positions, a spring biasing the trigger lever to the non-arresting position, and electromagnetic means for releasably holding the trigger lever at the arresting position. When the cam gear is engaged with a driving gear, it is rotated in one direction by the latter, but when the driving gear is opposed to the non-toothed portion, a stopper projection on the cam gear is abutted with the engaging projection to lock the cam gear there. When the trigger lever is released from the electromagnetic means, it is moved to the non-arresting position to release the cam gear while the projection operates the cam groove to rotate the cam gear into engagement with the driving gear, and then, the cam groove operates the projection to return the trigger lever to the arresting position.

3 Claims, 14 Drawing Sheets

5,211,066

CAM GEAR CONTROLLING MECHANISM

BACKGROUND OF THE INVENTION

1. Field of the Invention

This invention relates to a cam gear controlling mechanism, and more particularly to a controlling mechanism including a cam gear which has a cam portion and a gear portion which has a toothed portion and a non-toothed portion.

2. Description of the Prior Art

A controlling mechanism of the type which includes a cam gear is conventionally used to control the position of a movable member which is selectively moved to one of a plurality of control positions to establish a desired one of a plurality of control modes.

A controlling mechanism of the type mentioned is basically constructed so that it comprises a cam gear having a gear portion on which a plurality of non-toothed portions are formed individually corresponding to the controlling positions of such movable member and a controlling cam portion for pressing the movable member when the cam gear is rotated, a driving gear for rotating the cam gear when it is engaged with the gear portion of the cam gear, a pivotal trigger lever, electromagnetic means for controlling the trigger lever, initially rotating means and lever returning means. The cam gear has a plurality of stopper portions in sections thereof in which the non-toothed portions are opposed to the driving gear while an engaging projection for engaging with such stopper portions is provided on the trigger lever. While the trigger lever is attracted to the electromagnetic means, it is held at an arresting position at which the engaging projection thereof is positioned on a locus of rotation of the stopper portions, but when such attraction of the trigger lever by the electromagnetic means is cancelled, the engaging projection thereof is moved to a non-arresting position displaced from such locus of rotation.

The controlling mechanism operates in the following manner. In particular, the controlling mechanism normally establishes one of a plurality of modes wherein one of the non-toothed portions of the cam gear is opposed to the driving gear and a corresponding one of stopper portions of the cam gear is abutted with the engaging projection of the trigger lever to stop rotation of the cam gear while the movable member is held at one of the control positions. Then, if the attraction of the trigger lever to the electromagnetic means is cancelled to allow the trigger lever to be moved to a non-arresting position, then the cam gear is once rotated by the initially rotating means to an engaging position at which a next one of the toothed portions to the non-toothed portion which has been opposed to the driving gear till then engages the driving gear. Consequently, the cam gear is now rotated, from the engaging position, by the driving gear. During such rotation of the cam gear, the controlling cam portion thereof presses the movable member toward another control position while the trigger lever is returned to the arresting position by the lever returning means. Then, when the cam gear is rotated to a position at which a next non-toothed portion is opposed to the driving gear, another one of the stopper portions is abutted with the engaging projection of the trigger lever to stop rotation of the cam gear. Meanwhile, the movable member is moved to and thereafter held at another control position to establish another control mode.

As described above, a controlling mechanism of the type which includes a cam gear requires initially rotating means for rotating the cam gear to its engaging position when attraction of the trigger lever is cancelled in a certain control mode and lever returning means for returning the trigger lever to its arresting position at least for a period of time after the cam gear is moved to the engaging position until a next non-toothed portion is opposed to the driving gear.

Such initially rotating means is constructed in most cases so that the movable member is normally urged by a resilient force of resilient means and at whichever control position the movable member is, when the movable member presses the controlling cam portion of the cam gear under the resilient force of the resilient means, a turning force is applied to the cam gear so as to rotate the cam gear by some rotational angle. Meanwhile, the lever returning means in most cases is constructed as another cam means which is rotated by the cam gear to return the trigger lever from the non-arresting position to the arresting position.

Since the conventional controlling mechanism of the type including a cam gear has a large number of parts in this manner, it has a problem that it is complicated in construction and requires a great spacing for the arrangement of the parts. Further, since initial rotation of the cam gear is provided by initial movement of the movable member in a certain direction from the controlling position, it often occurs that the direction of such initial movement thereof must be set reversely to the direction of movement thereof to a next controlling position. Consequently, the controlling mechanism is disadvantageous in that much time is required for such movement of the movable member and setting of the controlling positions and/or strokes of movements is complicated.

On the other hand, as a mechanism for controlling the position of a movable member which is moved between two different positions, an electromagnetic operating mechanism is known which includes a magnetic attracting member such as a permanent magnet and a movable element slidably movable toward and away from the magnetic attracting member such as, for example, a solenoid plunger having a movable iron core.

An exemplary one of such conventional electromagnetic operating mechanisms is shown in FIG. 1A. Referring to FIG. 1A, the electromagnetic operating mechanism shown is generally denoted at a and includes a solenoid plunger b of the self-holding type including a permanent magnet c, a movable iron core e supported in a coil bobbin d for sliding movement toward and away from the magnet c and a coil f wound on the coil bobbin d. A movable member g is connected to the movable iron core e such that it is moved between a first position shown in FIG. 1A and a second position shown in FIG. 1B. The movable member g is normally biased toward the second position by resilient means not shown, and when it is pushed to move to the first position, the movable iron core e of the solenoid plunger b is attracted to the magnet c. Consequently, even if the force to urge the movable member g toward the first position disappears after then, the movable member g is held at the first position. On the other hand, if the coil f is energized in this condition, then the attraction of the movable iron core e by the magnet c is cancelled by a magnetic force produced from the coil f to allow the movable member g to be moved to the second position by the resilient means not shown.

In such electromagnetic operating mechanism a, connection between the movable iron core e and the movable member g is established in most cases by a connecting pin h provided on the movable member g and inserted in a connecting hole i formed in the movable iron core e.

By the way, in order to assure smooth movement of the movable iron core e and the movable member g of such electromagnetic operating mechanism a, the movable member g must necessarily press the movable iron core e in a direction parallel to the direction of movement of the movable iron core e. With such construction of the movable member g and the movable iron core e, a moment can be prevented which may otherwise act in a direction different from the direction of movement of the movable iron core e, and consequently, smooth movement of the movable iron core e and the movable member g can be assured.

Actually, however, it very seldom occurs that, after assembly of the electromagnetic operating mechanism a is completed, the direction in which the movable member g presses the movable iron core e, or more particularly, the direction in which the connecting pin h presses an inner face of the connecting hole i, is just in parallel to the direction of movement of the movable iron core e. Rather, it is more common that, due to tolerances in working accuracy of various portions of the movable member g or in accuracy in mounting of the movable member g and/or the solenoid plunger b and so forth, an axis of the connecting pin h and the inner face of the connecting hole i do not extend in parallel to each other, or even where the axis of the connecting pin h and the inner face of the connecting hole i extend considerably in parallel to each other, the direction itself of movement of the movable member g is inclined with respect to the direction of movement of the movable member g. In such condition, generally a location at which the connecting pin h presses the inner face of the connecting hole i will be displaced along the axis of the connecting pin h. Consequently, part of a force of the connecting pin h pressing the inner face of the connecting hole i acts as a vector in a direction perpendicular to the direction of movement of the movable iron core e. As a result, a loss takes place in the force of the movable member g pressing the iron core e while the movable iron core e is acted upon by a moment in a direction different from the direction of movement thereof, which will cause a so-called pinch between the movable iron core e and the inner face of the coil bobbin d.

Since such loss of a pressing force or pinch makes movement of the movable iron core e and the movable member g heavier, a malfunction may be caused such that the timing of movement of the movable member g is delayed or the movable member g is not moved to a predetermined position.

Further, if the movable iron core e is contacted with the magnet c while it remains in an inclined condition, then opposing faces of the magnet c and the movable iron core e are not closely contacted with each other and the movable iron core e is thus attracted to the magnet c in a condition wherein it is not contacted fully with the magnet c. In such attracted condition, the attracting force of the magnet c acting upon the movable iron core e is so low that, when some external force or shock acts, the movable iron core e may be removed readily from the magnet c.

Further, some tolerances cannot be avoided from accuracy in dimension of various portions of movable member, solenoid plunger, means for moving the movable member toward the solenoid plunger and so forth and also in dimension of mounting positions of those member, and some dispersion takes place in stroke of movement of the movable member among different electromagnetic operating mechanisms as products due to such tolerances. Consequently, even if the movable member comes to the attracted position, the movable iron core may not be contacted with the magnet.

Therefore, with a conventional electromagnetic operating mechanism of the type described above, a resilient portion having a so-called limiter function is frequency provided on the movable member so that some overstroke may be provided to an amount of movement of the movable member when the movable member is to be moved to the attracted position. For example, a resilient arm is formed on the movable member such that it may have a flexible elasticity in a direction of movement of the movable iron core so that the movable member is pressed toward the attracted position by way of the resilient arm while the stroke for such pressing operation is set a little greater than a stroke necessary for the movable member to come to the attracted position so as to provide an overstroke. Thus, the movable member is resiliently pressed against the solenoid plunger by the resilient force of the resilient arm in the overstroke. Consequently, the movable iron core is contacted with certainty with the magnet.

In this manner, with the conventional electromagnetic operating mechanism, since limiter means is provided on the movable member such that pressing by the pressing means to move the movable member to the attracted position may be performed by way of the resilient means and besides an overstroke is provided to such pressing operation, it is disadvantageous in that the movable member is complicated in construction or is great in size. Further, since the shapes, positions and so forth of the pressing means and the resilient portion are restricted from each other, it is also disadvantageous in that designing of shapes of various portions, layout of various members and so forth are very difficult.

SUMMARY OF THE INVENTION

It is an object of the present invention to provide a cam gear controlling mechanism which is simple in structure, small in overall size and high in reliability of operation.

In order to attain the object, according to the present invention, there is provided a cam gear controlling mechanism, which comprises a cam gear having a plurality of alternate toothed and non-toothed portions, a controlling cam portion having a required controlling function, and means defining a cam groove including a first cam face on which a plurality of stopper projections are formed and a second cam face on which a plurality of pressure receiving faces and pushing back faces are formed in pair individually in a substantially opposing relationship to the stopper projections, a trigger lever having an engaging projection fitted in the cam groove and movable between an arresting position at which the engaging projection is positioned on a locus of movement of the stopper projections upon rotation of the cam gear and a non-arresting position at which the engaging projection is outside the locus of movement of the stopper projections, spring means for biasing the trigger lever to the non-arresting position, and electromagnetic means for releasably holding the trigger lever at the arresting position, wherein the cam gear is rotated in one direction when any of the toothed portions thereof is brought into engagement with a driving gear, but when the driving gear is opposed to any of the non-toothed portions, one of the stopper projections is abutted with the engaging projection to lock the cam gear at the position, and when holding of the trigger lever at the arresting position is cancelled while the cam gear is in a locked condition, the trigger lever is moved to the non-arresting position to cancel locking of the cam gear while the engaging projection thereon presses one of the pressure receiving faces to rotate the cam gear to a position at which one of the toothed portions is engaged with the driving gear, whereafter one of the pushing back faces paired with the one pressure receiving face presses the engaging projection to return the trigger lever to the arresting position.

With the cam gear controlling mechanism, initial rotation required for the cam gear when a locked condition of the cam gear is cancelled, that is, rotation of the cam gear to the position at which one of the toothed portions thereof is engaged with the driving gear, is performed by movement of the trigger lever from the arresting position to the non-arresting position, and returning movement to the arresting position required for the trigger lever after such initial rotation is performed by rotation of the cam gear which is performed by the driving gear. Accordingly, special elements for performing such initial rotation of the cam gear and such returning movement of the trigger lever are not necessary, which allows simplification of a structure of a controlling mechanism of the type and reduction of a spacing for the arrangement of such controlling mechanism. Further, since a timing at which initial rotation of the cam gear is performed, another timing at which the trigger lever is returned to the arresting position and a further timing between such two operations are controlled with a high degree of accuracy in accordance with a positional relationship between the pressure receiving faces and the pushing back faces of the controlling cam groove and another positional relationship between the stopper projections and such pressure receiving faces and pushing back faces, a high reliability is assured with operation of the cam gear controlling mechanism.

The electromagnetic means may include a magnet and a solenoid plunger of the self holding type having a movable iron core slidably movable toward and away from the magnet, and one of the movable iron core and the trigger lever has a connecting projection formed thereon while the other has a connecting hole formed therein in which the connecting projection is fitted to connect the movable iron core and the trigger lever to each other, and besides the connecting hole has a dimension in the direction of movement of the movable iron core a little greater than the thickness of the connecting projection such that the iron core may be attracted to the magnet after the movable iron core is pressed by the trigger lever to move to a position in the proximity of the magnet. With the cam gear controlling mechanism, an overstroke of the trigger lever for contacting the movable iron core with certainty with the magnet is unnecessary, and accordingly, there is no necessity of provision of special limiter means for absorbing such overstroke of the trigger lever. Consequently, means for moving the trigger lever to the attracted position, a positional relationship between such means and the trigger lever and so forth can be set freely.

Preferably, a connecting pin is provided on the trigger lever and fitted in a connecting hole formed in a movable element of the electromagnetic means to connect the movable element and the trigger lever to each other, and a projected portion is formed at a location of the connecting pin opposing to an intermediate portion of the connecting hole in a direction of the length of the connecting hole so as to contact with an inner face of the connecting hole. With the cam gear controlling mechanism, the force of the trigger lever pressing the movable element is always applied to the portion at which the projected portion of the connecting pin contacts with the inner face of the connecting hole, that is, to the intermediate portion of the inner face of the connecting hole in the direction of the length of the connecting hole. Accordingly, even if an axis of the connecting pin and the inner face of the connecting hole do not extend in parallel to each other or the direction in which the connecting pin presses the inner face of the connecting hole is inclined a little with respect to the direction of movement of the movable element, it seldom occurs that a moment is produced with the movable element in a direction different from the direction of movement of the movable element. Accordingly, no pinch will take place between the movable element and a member on which the movable element is supported and little loss takes place with the force of the trigger lever pressing the movable element. Consequently, smooth movement of the movable element and the trigger lever can be assured and occurrence of a malfunction can be prevented.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 3:
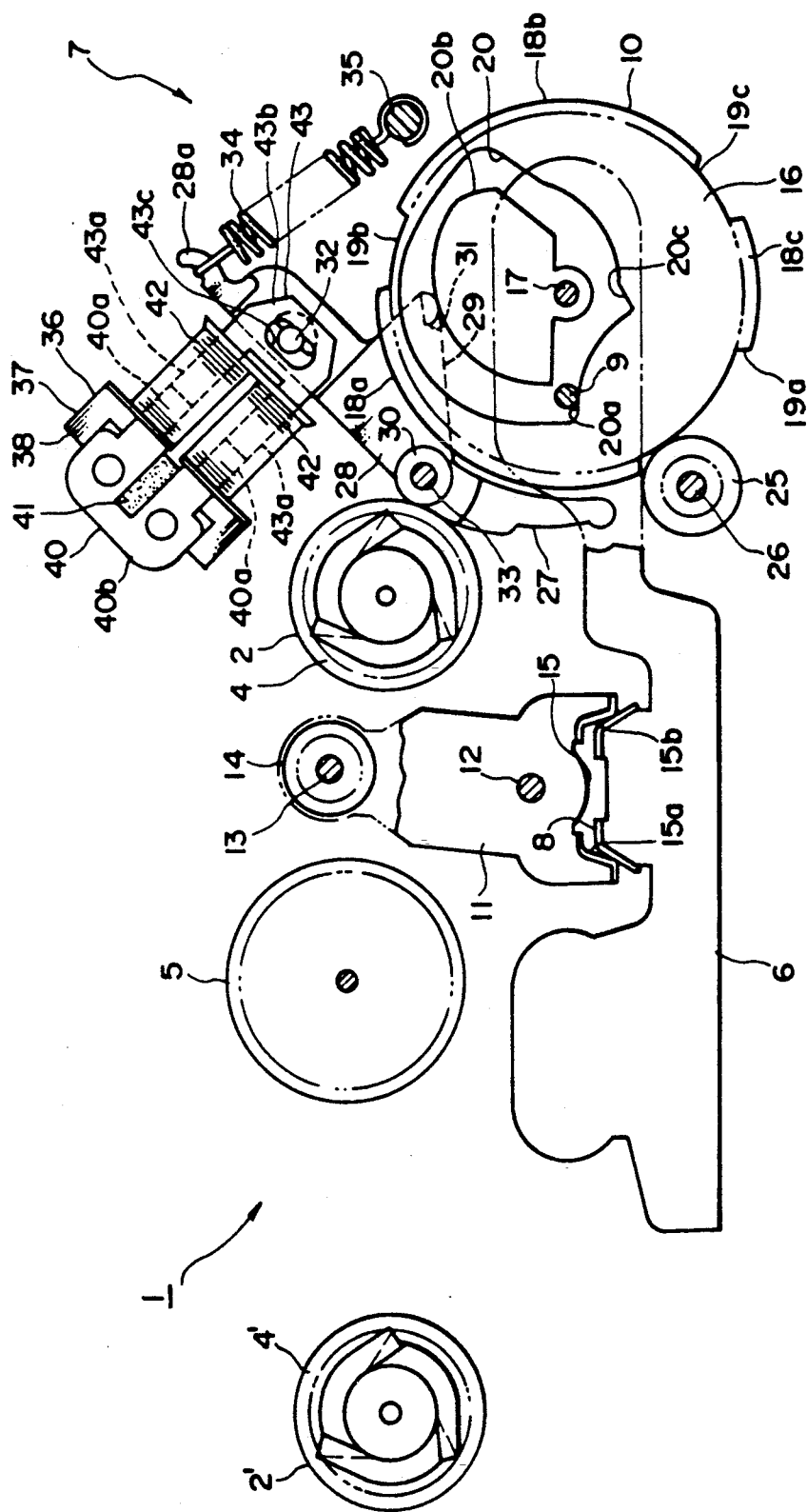
FIG. 3 is a plan view of a mode changing over apparatus in which the cam gear controlling mechanism of FIG. 2A is incorporated when a stopping mode is established.

Referring first to FIG. 3, there is shown a mode changing over apparatus for a tape player in which a controlling mechanism of the type including a cam gear according to the present invention is incorporated as a controlling mechanism for controlling the position of a mode changing over slider of the mode changing over apparatus. The mode changing over apparatus is generally denoted at 1.

Figure 9:
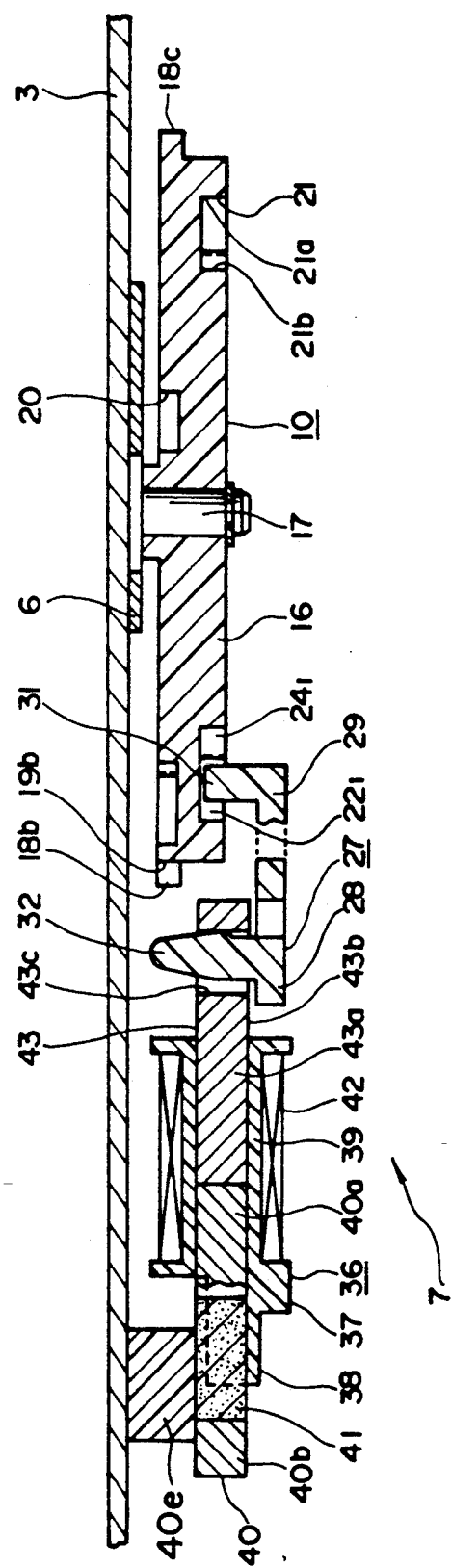
FIG. 9 is a sectional view taken along line IX—IX of FIG. 2A.

The mode changing over apparatus 1 includes a pair of reel bases 2 and 2' supported for rotation on a mechanism chassis 3 (refer to FIG. 9). The reel bases 2 and 2' are disposed in a spaced relationship from each other in a leftward and rightward direction in FIG. 3. It is to be noted that, when a direction is hereinafter referred to, it is based on FIG. 3 such that a leftward or a rightward direction is a leftward or a rightward direction in FIG. 3 and a forward or a rearward direction is a downward or an upward direction in FIG. 3. The right-hand side reel base 2 is adapted to receive thereon a tape reel for taking up a tape not shown thereon when the tape is fed in one direction (hereinafter referred to as "normal direction"). Accordingly, the reel base 2 will be hereinafter referred to as take-up side reel base. Meanwhile, the other left-hand side reel base 2' is adapted to receive thereon another tape reel for supplying a tape therefrom when the tape is fed in the normal direction and taking up the tape when the tape is fed in a reverse direction opposite to the normal direction. The reel base 2' will be hereinafter referred to as supply side reel base. Each of the reel bases 2 and 2' has a gear portion 4 or 4'. A supply side input gear 5 is normally connected to the gear portion 4' of the supply side reel base 2' by way of a transmitting gear not shown.

A mode changing over slider 6 in the form of a plate elongated in the leftward and rightward direction is supported for sliding movement in the leftward and rightward direction on a lower face of the mechanism chassis 3. The mode changing over slider 6 is moved by a controlling mechanism 7 from and to a stopping position shown in FIG. 3 which is a substantially mid position within a range of movement at which it establishes a stopping mode, a normal position shown in FIG. 4 which is a left end position within the range of movement at which it establishes a normal mode in which a tape is fed in the normal direction, and a reverse position shown in FIG. 5 which is a right end position in the range of movement at which it establishes a reverse mode in which a tape is fed in the reverse direction. The mode changing over slider 6 is thus moved between the stopping position and the normal position or between the reverse position and the stopping position.

A pressing portion 8 having a substantially trapezoidal shape elongated in the leftward and rightward direction is formed on and extends from a substantially mid portion of a rear edge of the mode changing over slider 6. A pressure receiving pin 9 is mounted on a lower face of a right end portion of the mode changing over slider 6 for engaging a controlling cam portion or lobe 20 of a cam gear 10 of the controlling mechanism 7 to move, when the cam gear 10 rotates in the counterclockwise direction in FIG. 2, the mode changing over slider 6 from the stopping position to the normal position or to the reverse position. Though not shown, resilient means is provided for normally biasing the mode changing over slider 6 to the stopping position. Consequently, the mode changing over slider 6 is returned, when allowed, from the reverse position or from the normal position to the stopping position.

A rockable lever 11 elongated in the forward and rearward direction is supported at a portion adjacent a front end thereof for pivotal motion on a support shaft 12 mounted on the mechanism chassis 3, and a gear supporting shaft 13 is mounted downwardly at a rear end portion of the rockable lever 11. A large gear not shown and a small gear 14 are supported for integral rotation on the gear supporting shaft 13, and the large gear is normally held in meshing engagement with an intermediate gear not shown of a driving system not shown while the small gear 14 is positioned between the gear portion 4 of the take-up side reel base 2 and the supply side input gear 5.

A substantially channel-shaped recess 15 opened toward the front is formed at a front end of the rockable lever 11. When the mode changing over slider 6 is at the stopping position, the pressing portion 8 thereof is fitted in the recess 15 of the rockable lever 11 to prevent pivotal motion of the rockable lever 11 and hold it at its neutral position shown in FIG. 3 wherein the small gear 14 thereon is positioned substantially intermediately between the gear portion 4 of the take-up side reel base 2 and the supply side input gear 5 and does not engage either of the gear portion 4 of the take-up side reel base 2 and the supply side input gear 5. A stopping mode is thus established by the mode changing over slider 6 at the stopping position shown in FIG. 3.

Figure 4:
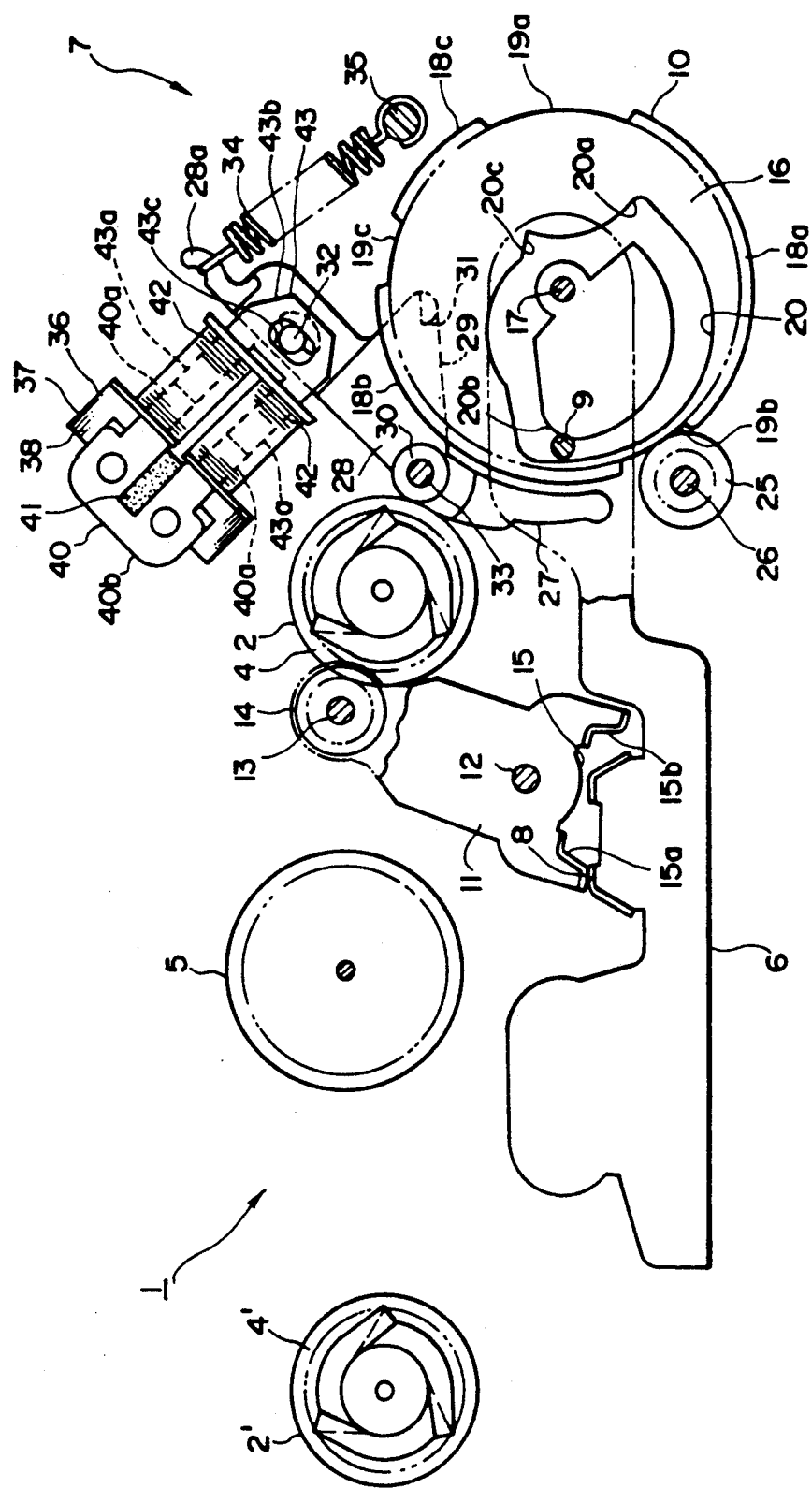
FIG. 4 is a similar view but showing the mode changing over mechanism of FIG. 3 when a normal mode is established.

Then, if the cam gear 10 is rotated in the counterclockwise rotation in FIG. 3 in this condition, then the pressure receiving pin 9 of the mode changing over slider 6 is pressed leftwardly to move to its normal position by the controlling mechanism 7. During such leftward movement of the mode changing over slider 6, the pressing portion 8 thereof presses a left-hand side edge 15a of the recess 15 of the rockable lever 11 to pivot the rockable lever 11 in the clockwise direction around the support shaft 12. Thereupon, the small gear 14 on the rockable lever 11 is brought into engagement with the gear portion 4 of the take-up side reel base 2 as seen in FIG. 4. Consequently, the take-up side reel base 2 is thereafter rotated in its tape winding direction by way of the driving system not shown and the small gear 14. A normal mode is thus established by the mode changing over slider 6 at the normal position.

After the mode changing over slider 6 comes to the normal position, rotation of the cam gear 10 is stopped. Consequently, the mode changing over slide 6 is thereafter held at the normal position by the thus stopping cam gear 10 unless stopping of rotation of the cam gear 10 is cancelled.

Figure 5:
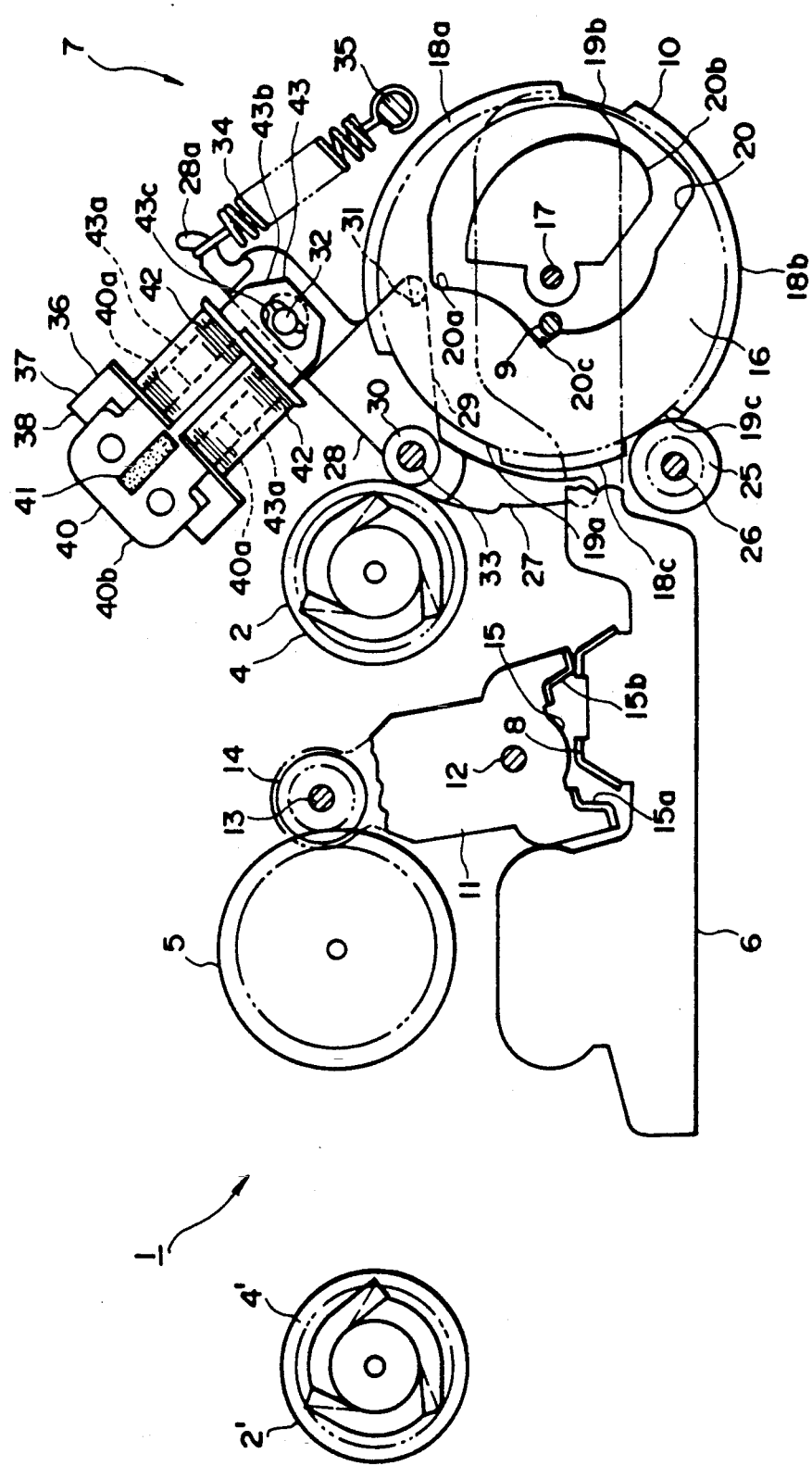
FIG. 5 is a similar view but showing the mode changing over mechanism of FIG. 3 when a reverse mode is established.

If stopping of rotation of the cam gear 10 is cancelled while a normal mode is established, then the cam gear 10 is rotated. Consequently, as such rotation of the cam gear 10 proceeds, the mode changing over slider 6 is allowed to be returned to the stopping position by the force exerted by the resilient means not shown. After the mode changing over slider 6 is returned to the stopping position, as rotation of the cam gear 10 continues, the pressure receiving pin 9 thereon is pressed rightwardly by the controlling cam portion 20 of the cam gear 10 to move the mode changing over slider 6 toward the reverse position. Thereupon, the pressing portion 8 of the mode changing over slider 6 presses a right-hand side edge 15b of the recess 15 of the rockable lever 11 to pivot the rockable lever 11 in the counterclockwise direction in FIG. 3 around the support shaft 12. Upon such pivotal motion of the rockable lever 11, the small gear 14 thereon is brought into engagement with the supply side input gear 5 as seen in FIG. 5 so that it is operatively connected to the gear portion 4' of the supply side reel base 2' by way of the driving system. Consequently, the supply side reel base 2' is rotated in its tape winding direction. A reverse mode is thus established by the mode changing over slider 6 at the reverse position.

Also after the mode changing over slider 6 comes to the reverse position, rotation of the cam gear 10 is stopped, and consequently, the mode changing over slider 6 is thereafter held at the reverse position by the cam gear 10 in the stopping condition.

Then, if stopping of rotation of the cam gear 10 is cancelled while a reverse mode remains established, then the cam gear 10 is rotated. Consequently, the mode changing over slider 6 is allowed to be moved to the stopping position by the biasing force of the resilient means not shown. Then, just when the mode changing over slider 6 returns to the stopping position, rotation of the cam gear 10 is stopped.

A desired mode is thus established selectively in this manner.

It is to be noted that the cam gear 10 is rotated in a fixed direction, that is, in the counterclockwise direction as viewed from above.

Figure 1A:
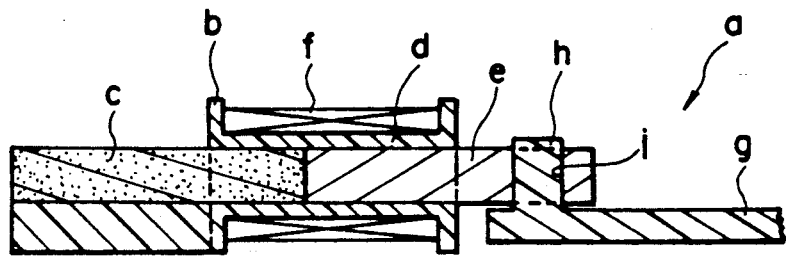
FIGS. 1A and 1B are sectional views showing a conventional electromagnetic operating mechanism at different positions.
Figure 1B:
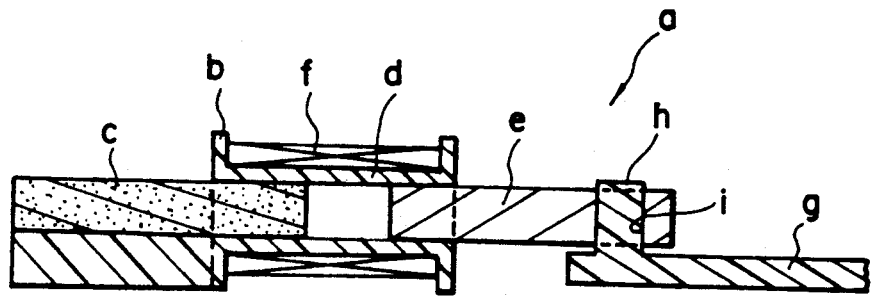
Figure 2A:
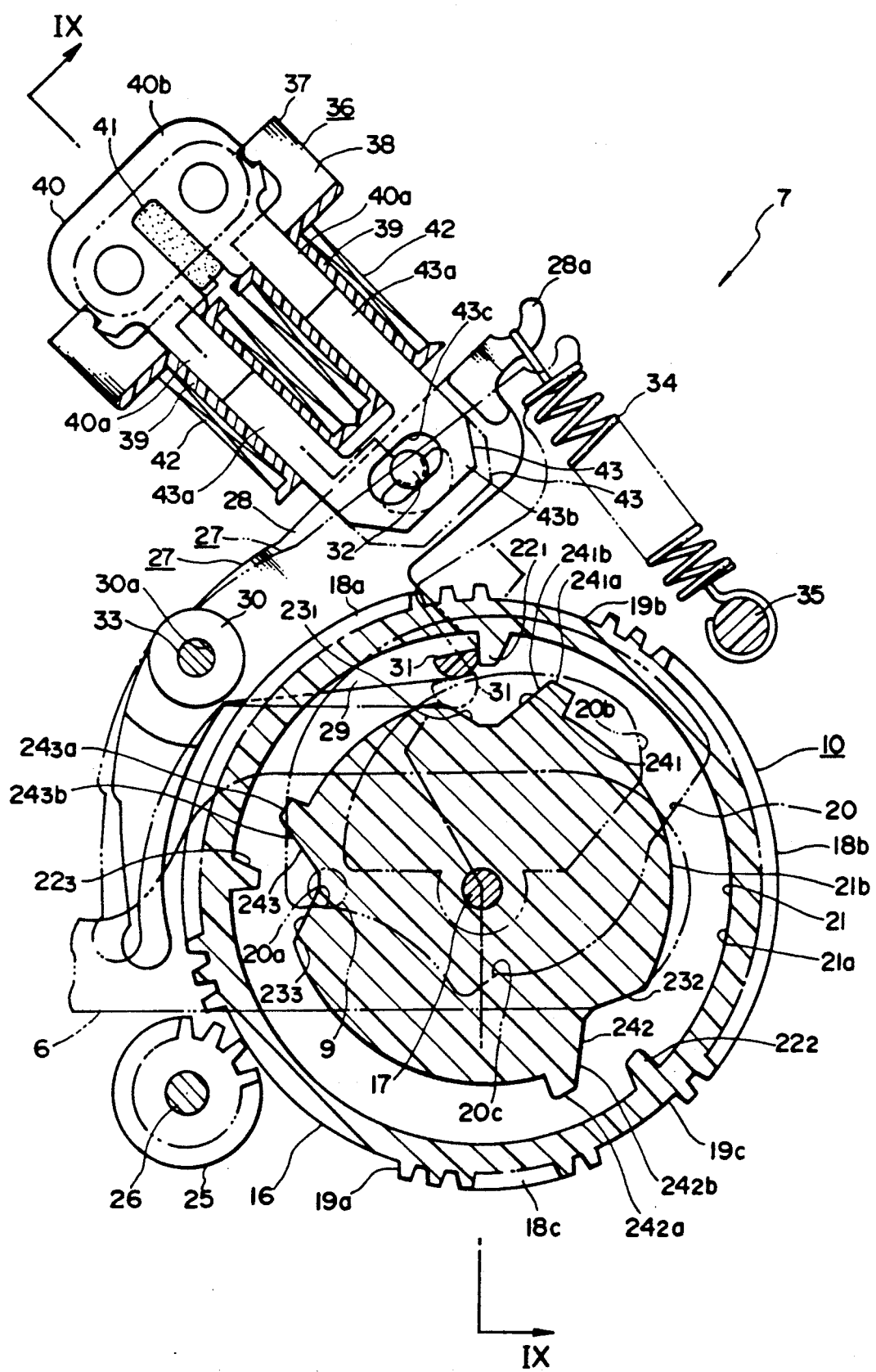
FIGS. 2A to 2E are horizontal sectional views showing a cam gear controlling mechanism of an embodiment of the present invention at successive different stages of operation.

Referring now to FIGS. 2A and 3, the controlling mechanism 7 includes, in addition to the cam gear 10, a driving gear 25 for rotating the cam gear 10, a trigger lever 27 for selectively stopping the cam gear 10 at one of three stopping positions including a first position it assumes when the mode changing over 6 is at the stopping position, a second position it assumes when the mode changing over slider 6 is at the normal position and a third position it assumes when the mode changing over slider 6 is at the reverse position, a solenoid plunger 36 for controlling the trigger lever 27, and a tension spring 34 for applying a turning force to the trigger lever 27.

Figure 8:
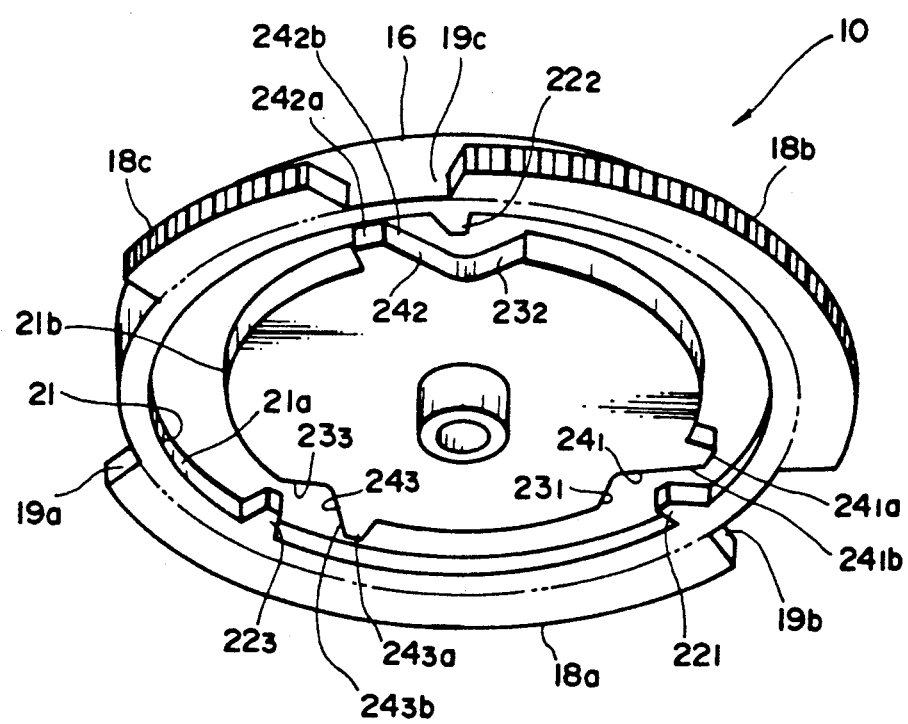
FIG. 8 is an enlarged perspective view of a cam gear of the cam gear controlling mechanism of FIG. 2A.

Referring also to FIGS. 8 and 9, the cam gear 10 has a main portion 16 in the form of a disk supported at a central portion thereof for rotation on a support shaft 17 mounted on a lower face of the mechanism chassis 3. The main portion 16 of the cam gear 10 has three toothed portions 18a, 18b and 18c formed on an outer periphery thereof with three non-toothed portions 19a, 19b and 19c left between them, respectively, such that, when the cam gear 10 is at a first position shown in FIGS. 2A and 3, the first toothed portion 18a is extends over a range of about 120 degrees or more in central angle in the counterclockwise direction from a position substantially just behind the center of the cam gear 10; the second toothed portion 18b next to the first toothed portion 18a in the clockwise direction has an extent of about 110 degrees in central angle; and the other or third toothed portion 18c has an extent of about 40 degrees in central angle. Meanwhile, the first non-toothed portion 19a between the first and third toothed portions 18a and 18c has an extent of about 40 degrees in central angle; the non-toothed second portion 19b between the first and second toothed portion 18a and 18b has an extent of about 25 degrees in central angle; and the remaining third toothed portion 19c has an extent of about 25 degrees in central angle.

The controlling cam portion 20 is formed on an upper face of the main portion 16 of the cam gear 10. The controlling cam portion 20 is formed as an endless groove, and the pressure receiving pin 9 of the mode changing over slider 6 is fitted for sliding movement in the controlling cam portion 20 on the left side with respect to the center of the cam gear 10. A substantially half portion of the controlling cam portion 20 extends substantially in a semicircular arc centered at a position eccentric from the center of the cam gear 10 while the remaining portion of the controlling cam portion 20 extends in a substantially L-shaped bent condition. A left end portion 20a of a portion of the controlling cam portion 20 which extends substantially leftwardly from the center of the cam gear 10 when the cam gear 10 is at the first position is provided at a location substantially intermediately between the center and an outer peripheral edge of the cam gear 10, and when the pressure receiving pin 9 is positioned at the portion 20a as seen in FIG. 3, the mode changing over slider 6 is at the stopping position; another portion 20b of the controlling cam portion 20 which is positioned just leftwardly of the center of the cam gear 10 when the cam gear 10 is at the second position shown in FIG. 4 is provided at a location adjacent the outer periphery of the cam gear 10, and when the pressed piece 9 is positioned at the portion 20b as seen in FIG. 4, the mode changing over slider 6 is held at the normal position; and a further portion 20c which is positioned just leftwardly of the center of the cam gear 10 when the cam gear 10 is at the third position shown in FIG. 5 is provided at a location adjacent the center of the cam gear 10, and when the pressure receiving pin 9 is positioned at the portion 20c as seen in FIG. 5, the mode changing over slider 6 is held at the reverse position.

A control cam groove 21 is formed on a lower face at a location adjacent the outer periphery of the main portion 16 of the cam gear 10 such that it extends in an endless fashion in a circumferential direction around the center coincident with the center of the cam gear 10. Three thin, substantially trapezoidal stopper projections $22_1$, $22_2$ and $22_3$ are formed on an outer circumferential face 21a of the control cam groove 21 of the cam gear 10 remote from the center such that they extend radially inwardly toward the center of the cam gear 10. The three stopper projections $22_1$, $22_2$ and $22_3$ are disposed so that the first stopper projection $22_1$ is positioned substantially just behind the center of the cam gear 10 when the cam gear 10 is at the first position; the second stopper projection $22_2$ next to the first stopper projection $22_1$ in the clockwise direction is positioned substantially just behind the center of the cam gear 10 when the cam gear 10 is at the second position; and the remaining third stopper projection $22_3$ is positioned substantially just behind the center of the cam gear 10 when the cam gear 10 is at the third position.

A pressure receiving face $23_1$ and a pushing back face $24_1$ in pair, another pressure receiving face $23_2$ and another pushing back face $24_2$ in pair and a further pressure receiving face $23_3$ and a further pushing back face $24_3$ in pair are formed at locations of an inner circumferential face 21b of the control cam groove 21 opposing to the stopper projections $22_1$, $22_2$ and $22_3$, respectively, such that they are opened in such a manner as to make substantially L-shapes relative to each other in an opposing relationship to the respective stopper projections $22_1$, $22_2$ and $22_3$. The pushing back faces $24_1$, $24_2$ and $24_3$ are positioned on the trailing sides of the pressure receiving faces $23_1$, $23_2$ and $23_3$, respectively, in the direction of rotation of the cam gear 10, that is, in the counterclockwise direction, and end portions $24_1a$, $24_2a$ and $24_3a$ thereof extend substantially in parallel to the circumferential faces 21a and 21b in such a manner as to provide a laterally bent condition relative to the remaining portions thereof and are positioned at substantially mid locations between the circumferential faces 21a and 21b of the control cam groove 21.

It is to be noted that the pressure receiving faces $23_1$, $23_2$ and $23_3$ are inclined with respect to straight lines interconnecting the corresponding stopper projections $22_1$, $22_2$ and $22_3$ and the center of the cam gear 10 by an angle of about 60 degrees while main portions $24_1b$, $24_2b$ and $24_3b$ of the pushing back faces $24_1$, $24_2$ and $24_3$ except the end portions $24_1a$, $24_2a$ and $24_3a$ are inclined by an angle of about 50 degrees.

Referring to FIGS. 2A and 3, the driving gear 25 is supported for rotation on a support shaft 26 mounted on the lower face of the mechanism chassis 3 and is positioned forwardly leftwards of the cam gear 10 such that the pitch circle thereof circumscribes the pitch circle of the toothed portions 18a, 18b and 18c of the cam gear 10. The driving gear 25 is also rotated by the driving system not shown, and when the cam gear 10 is to be rotated, the driving gear 25 is rotated in the clockwise direction as viewed from above.

When the cam gear 10 is at the first position, an end portion of the first non-toothed portion 19a adjacent the first toothed portion 18a is opposed to the driving gear 25; when the cam gear 10 is at the second position, the second non-toothed portion 19b is opposed to the driving gear 25; and when the cam gear 10 is at the third position, the third non-toothed portion 19c is opposed to the driving gear 25. Accordingly, when the cam gear 10 is at any of the first to third positions, even if the driving gear 25 rotates, the cam gear 10 will not be rotated by the driving gear 25 at all. However, if initial rotation of the cam gear 10 (which will be hereinafter described) from any of the first to third positions takes place, then that one of the toothed portions 18a, 18b and 18c of the cam gear 10 which has been positioned adjacent the driving gear 25 on the trailing side in the direction of rotation of the cam gear 10 till then will be brought into meshing engagement with the driving gear 25.

Figure 6:
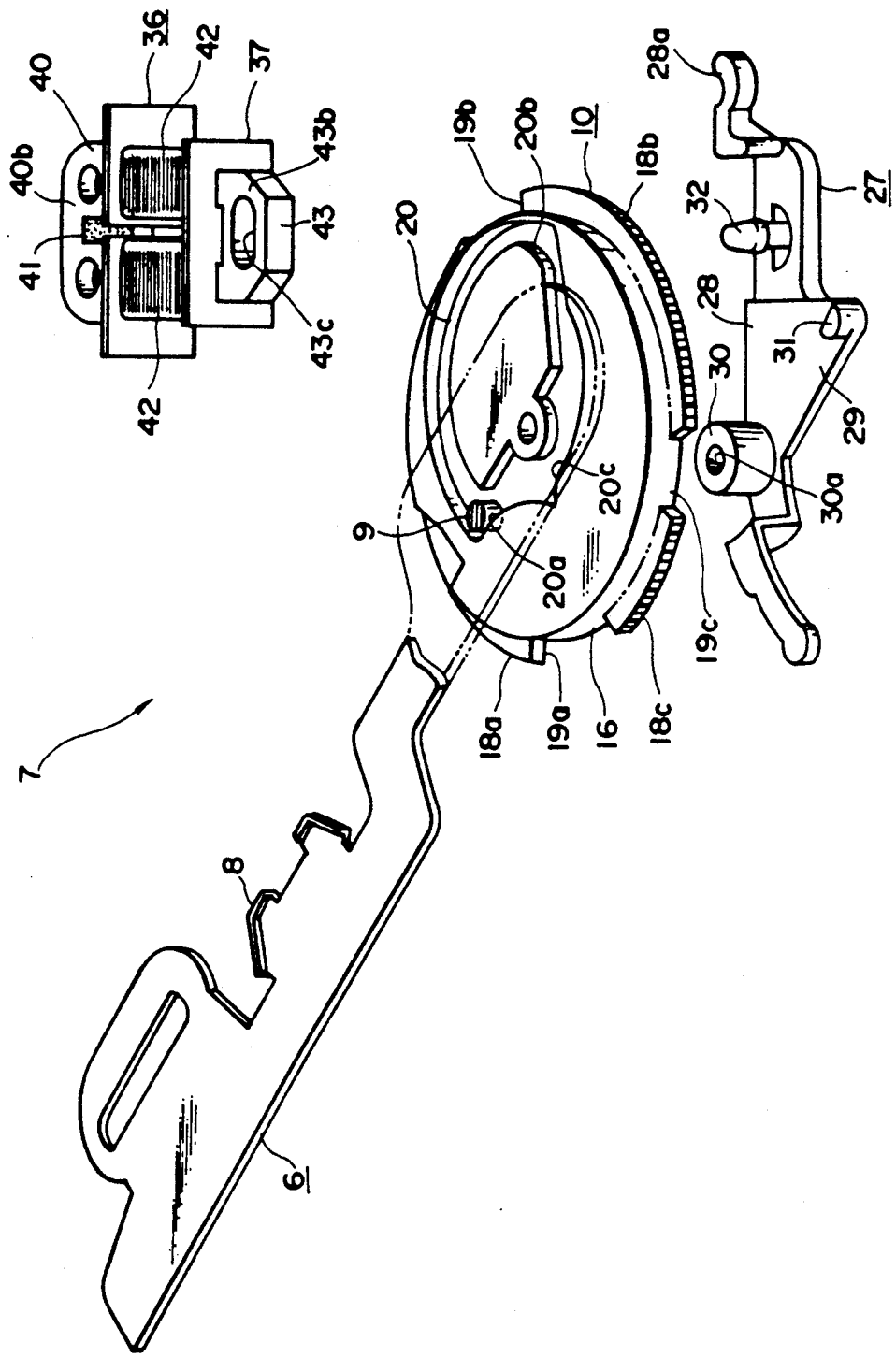
FIG. 6 is a fragmentary perspective view, partly broken, of part of the mode changing over apparatus of FIG. 3.
Figure 7:
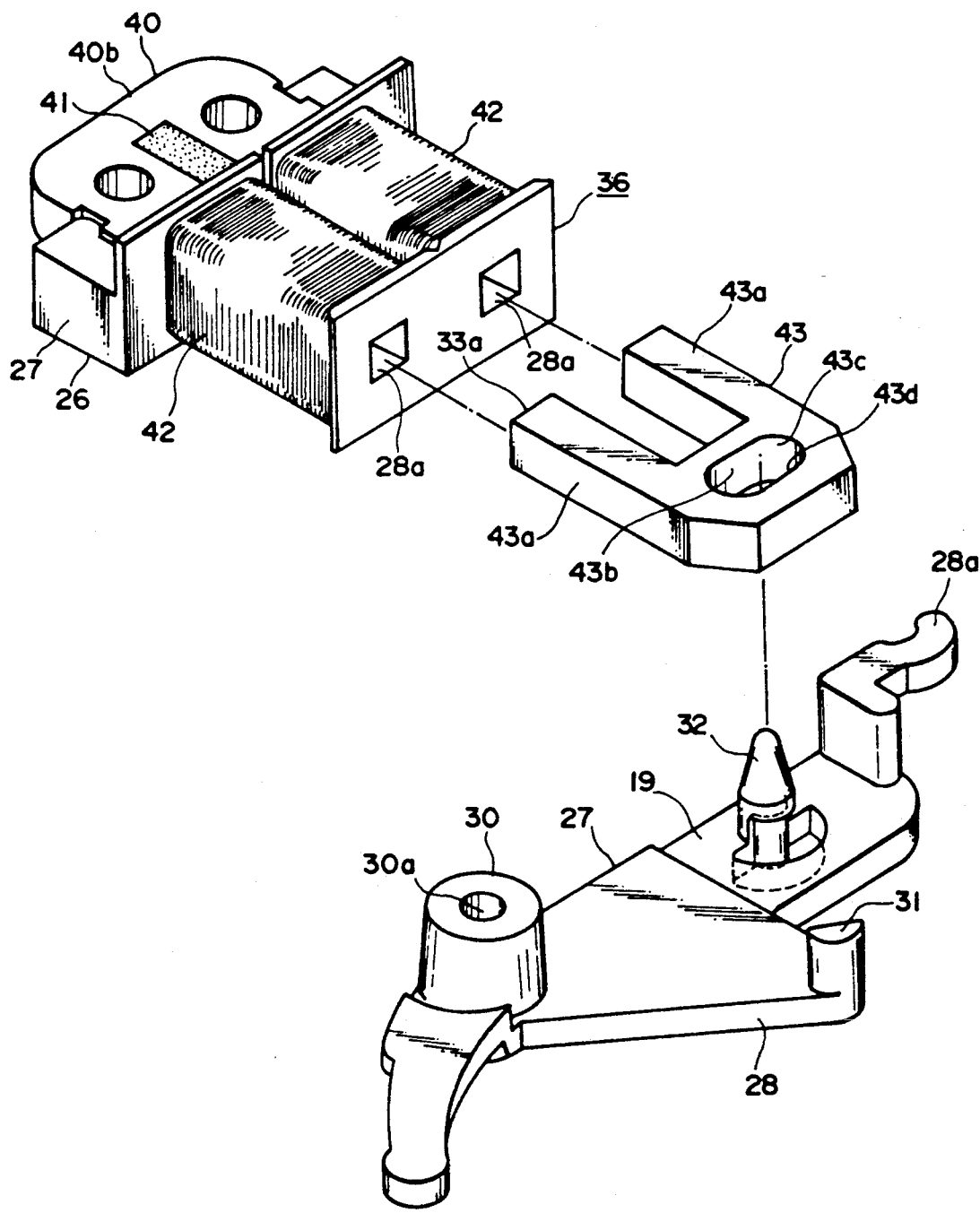
FIG. 7 is an enlarged fragmentary perspective view showing a trigger lever and a solenoid plunger of the cam gear controlling mechanism of FIG. 2A.

Referring also to FIGS. 6, 7 and 9, the trigger lever 27 has a main portion 28 having a substantially J-shape as viewed from above. A substantially triangular arm 29 extends substantially laterally rightwardly from an intermediate portion of a side edge of the main portion 28 which is directed rightwardly forwards. A hub 30 is provided upwardly at a location of the main portion 28 a little forwardly of a mid portion in a longitudinal direction while an engaging projection 31 is provided upwardly at an end of the arm 29. A rear end 28a of the main portion 28 is formed as a spring anchoring tab positioned a little higher than the remaining portion of the trigger lever 27, and a substantially column-like connecting pin 32 is provided uprightly on an upper face of the main portion 28 adjacent the spring anchoring tab 28a.

A support shaft 33 is mounted at a location on the lower face of the mechanism chassis 3 leftwardly a little rearwards of the cam gear 10 and is fitted in a fitting hole 30a perforated in the hub 30 of the trigger lever 27 to support the trigger lever 27 for pivotal motion thereon.

An upper portion of the engaging projection 31 of the trigger lever 27 is positioned in the control cam groove 21 substantially just behind the center of the cam gear 10. The engaging projection 31 has a substantially semicircular horizontal section, and an arcuate face thereof is opposed to the inner circumferential face 21b of the control cam groove 21 of the cam gear 10.

The tension spring 34 has an end portion anchored at a spring anchoring pin 35 mounted on the lower face of the mechanism chassis 3 and has the other end portion anchored at the spring anchoring tab 28a of the trigger lever 27. The tension spring 34 thus exerts a tensile force to normally bias the trigger lever 27 in the clockwise direction as viewed from above.

Accordingly, when the trigger lever 27 is not pressed in the counterclockwise direction, it is held at a non-arresting position at which the engaging projection 31 contacts with the inner circumferential face 21b of the control cam groove 21 of the cam gear 10, and when the trigger lever 27 is at the non-arresting position, the engaging projection 31 thereof is positioned outside a locus of movement of the stopper projections $22_1$, $22_2$ and $22_3$ upon rotation of the cam gear 10.

The solenoid plunger 36 is secured to the lower face of the mechanism chassis 3. The solenoid plunger 26 has a base 37 having a fixing portion 38 and a pair of coil bobbins 39 formed as a unitary member from a synthetic resin. The fixing portion 38 has a horizontally elongated substantially channel-shaped profile while the coil bobbins 39 project substantially in parallel to each other from a side face of the fixing portion 38 and each has a substantially angular tubular profile. A substantially channel-shaped yoke 40 has a pair of portions 40a extending in parallel to each other and inserted, at portions adjacent ends thereof, in substantially half portions of holes of the coil bobbins 39 adjacent the fixing portion 38 of the solenoid plunger 26 while the remaining portion 40b of the yoke 40 is held on the fixing portion 38. A magnet 41 is disposed at a portion of the yoke 40 between the portions 40a projecting from the coil bobbins 39 and is adhered to the yoke 40. A coil 42 is wound on each of the coil bobbins 39.

A movable element 43 is made of a magnetic material and has a substantially channel-shaped profile. The movable element 43 has a pair of attraction portions 43a extending in parallel to each other and inserted for sliding movement in the coil bobbins 39. The movable element 43 has a connecting hole 43c in the form of an elongated hole formed at a base portion thereof at which base ends of the attraction portions 43a are connected to each other. The dimension of the connecting hole 43c in the direction of movement of the movable iron core 43, that is, the distance between two side faces 43b and 43d (FIG. 7) of the connecting hole 43c which extend in parallel to each other perpendicularly to the direction of movement of the iron core 43, is set a little greater than a thickness of an intermediate portion of the connecting pin 32 of the trigger lever 7 as particularly seen in FIGS. 9 and 10.

The solenoid plunger 36 of such construction is secured to a location of the lower face of the mechanism chassis 3 rearwardly a little leftwards of the cam gear 10 such that the movable element 43 is moved substantially along a locus of the connecting pin 32 of the trigger lever 27 upon pivotal motion of the trigger lever 27. The solenoid plunger 36 may be secured to the mechanism chassis 3 such that the portion 40b of the yoke 40 is secured by means of securing means such as a fastening screw not shown to a mounting seat 40e mounted on the mechanism chassis 3 as seen in FIG. 9.

The connecting pin 32 of the trigger lever 27 is inserted in the connecting hole 43c of the movable element 43 with a small gap left therebetween. The trigger lever 27 is thus connected to the movable element 43 of the solenoid plunger 36 by way of the connecting hole 43c and the connecting pin 32.

When the movable element 43 is attracted to the yoke 40, the connecting pin 32 is abutted with one 43d of the two side faces 43b and 43d of the connecting hole 43 remote from the yoke 40 to prevent further pivotal movement of the trigger lever 27 in the clockwise direction, and consequently, the position of the trigger lever 27 is controlled against the tensile force of the tension spring 34. In this condition, the trigger lever 27 is held at its arresting position at which the engaging projection 31 thereof is positioned on the locus of the stopper projections $22_1$, $22_2$ and $22_3$ of the cam gear 10 upon rotation of the cam gear 20 as shown in FIG. 2A. However, if the solenoid plunger 36 is energized in this condition, then the attracting force by the yoke 40 is cancelled by a magnetic force produced by such solenoid plunger 36 so that the attraction of the movable element 43 by the yoke 40 is cancelled and the trigger lever 27 is allowed to be moved to the non-arresting position by the tensile force of the tension spring 34.

The controlling mechanism 7 of such construction operates in the following manner.

The solenoid plunger 36 is temporarily energized when the cam gear 10 is to be rotated, or in other words, when it is intended to establish a mode different from a current mode.

As described hereinabove, when the trigger lever 27 is at the arresting position, the engaging projection 31 thereon is positioned just behind the center of the cam gear 10 on the locus of the stopper projections $22_1$, $22_2$ and $22_3$ of the cam gear 10 upon rotation of the cam gear 10. Consequently, if the trigger lever 27 is moved to the arresting position after starting of rotation of the cam gear 10 is started, then as such rotation of the cam gear 10 proceeds, that one of the stopper projections $22_1$, $22_2$ and $22_3$ which has been at a trailing position nearest to the engaging projection 31 in the direction of rotation of the cam gear 10 finally comes to the position substantially just behind the center of the cam gear 10, whereupon the stopper projection $22_1$ is abutted with the engaging projection 31 as indicated by a solid line in FIG. 2A. Consequently, rotation of the cam gear 10 is stopped. The position of the cam gear 10 then is one of the three stopping positions described hereinabove.

During such rotation of the cam gear 10, when it comes to such stopping position or a position a little forwardly of such stopping position, one of the three non-toothed portions 19a, 19b and 19c comes to a position in which it is opposed to the driving gear 25.

Figure 2B:
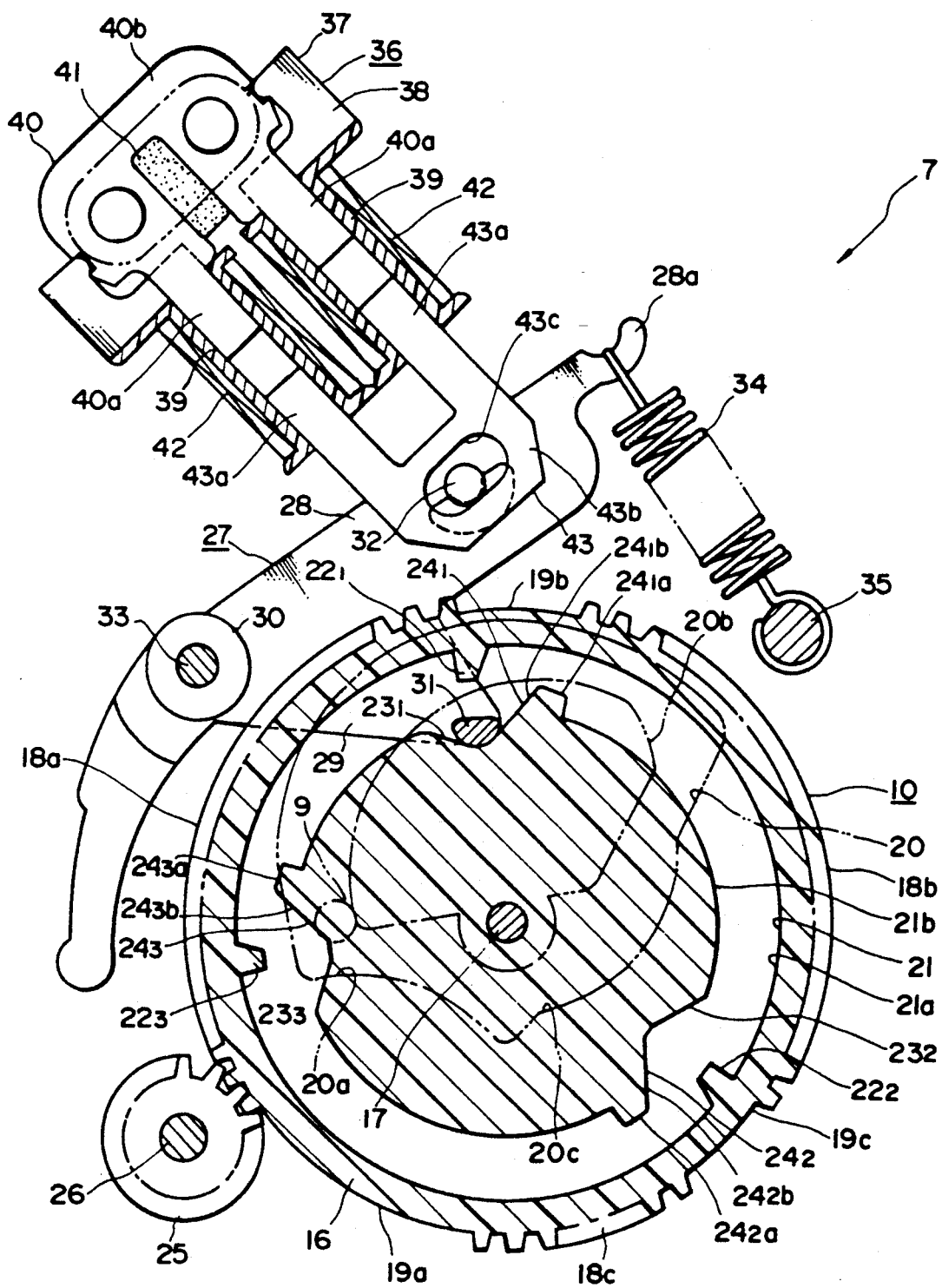

Then, if the solenoid plunger 36 is energized when the cam gear 10 is at such stopping position, then the attracting force of the yoke 40 is cancelled by a magnetic force produced from the solenoid plunger 36 to cancel the attraction of the movable iron core 43 by the yoke 40 to release the trigger lever 27. Consequently, the trigger lever 27 is pivoted in the clockwise direction as indicated in phantom in FIG. 2A by the tensile force of the tension spring 34. Thereupon, the side face 43d of the connecting hole 43d of the movable iron core 43 is pushed by the connecting pin 32 so that the movable iron core 43 is pulled to move following the trigger lever 27. Upon clockwise pivotal motion of the trigger lever 27, the engaging projection 31 thereon is displaced from the locus of movement of the stopper projections $22_1$, $22_2$ and $22_3$ upon rotation of the cam gear 10 to cancel stopping of rotation of the cam gear 10 till then. After then, the engaging projection 31 presses one of the pressure receiving faces $23_3$ corresponding to the stopper projection $22_3$ to cause initial rotation of the cam gear 10. For example, if the trigger lever 27 is moved to the non-arresting position while the cam gear 10 is at the first position as shown FIG. 2A, then the engaging projection 31 thereon is abutted with and presses the pressure receiving face $23_1$ substantially toward the front. Consequently, the cam gear 10 is rotated a little in the counterclockwise direction in FIG. 2A by a camming action between the engaging projection 31 and the pressure receiving face $23_1$. Such rotation is initial rotation, and such initial rotation continues until the engaging projection 31 is contacted with a location at which the pressure receiving face $23_1$ and the pushing back face $24_1$ connect to each other as shown in FIG. 2B. When the cam gear 10 is thus initially rotated, the first toothed portion 18a of the cam gear 10 is brought into meshing engagement with the driving gear 25. Consequently, the driving gear 25 thereafter rotates the cam gear 10.

Figure 2C:
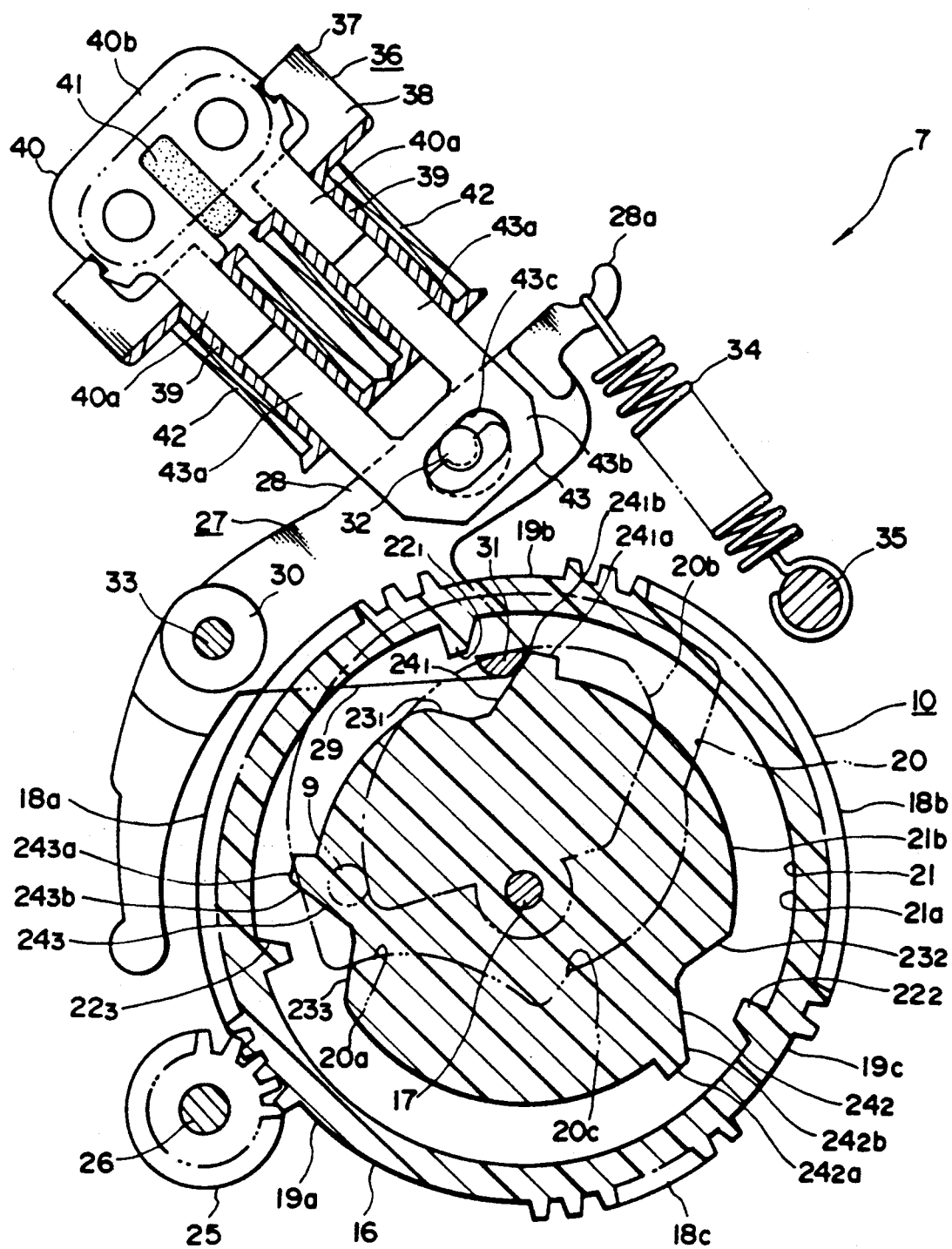

As rotation of the cam gear 10 proceeds in this manner, the pushing back face 24 thereon now pushes the trigger lever 27 back to the arresting position. For example, the pushing back face $24_1$ pushes the engaging projection 31 of the trigger lever 27 from the position shown in FIG. 2B substantially leftwardly rearwards as seen in FIG. 2C so that the trigger lever 27 is pivoted in the counterclockwise direction in FIG. 2C toward its arresting position. Upon such counterclockwise pivotal motion of the trigger lever 27, the side face 43b of the connecting hole 43 of the movable iron core 43 is pressed by the connecting pin 32 on the trigger lever 27 so that the movable iron core 43 is moved toward the yoke 40.

Figure 2D:
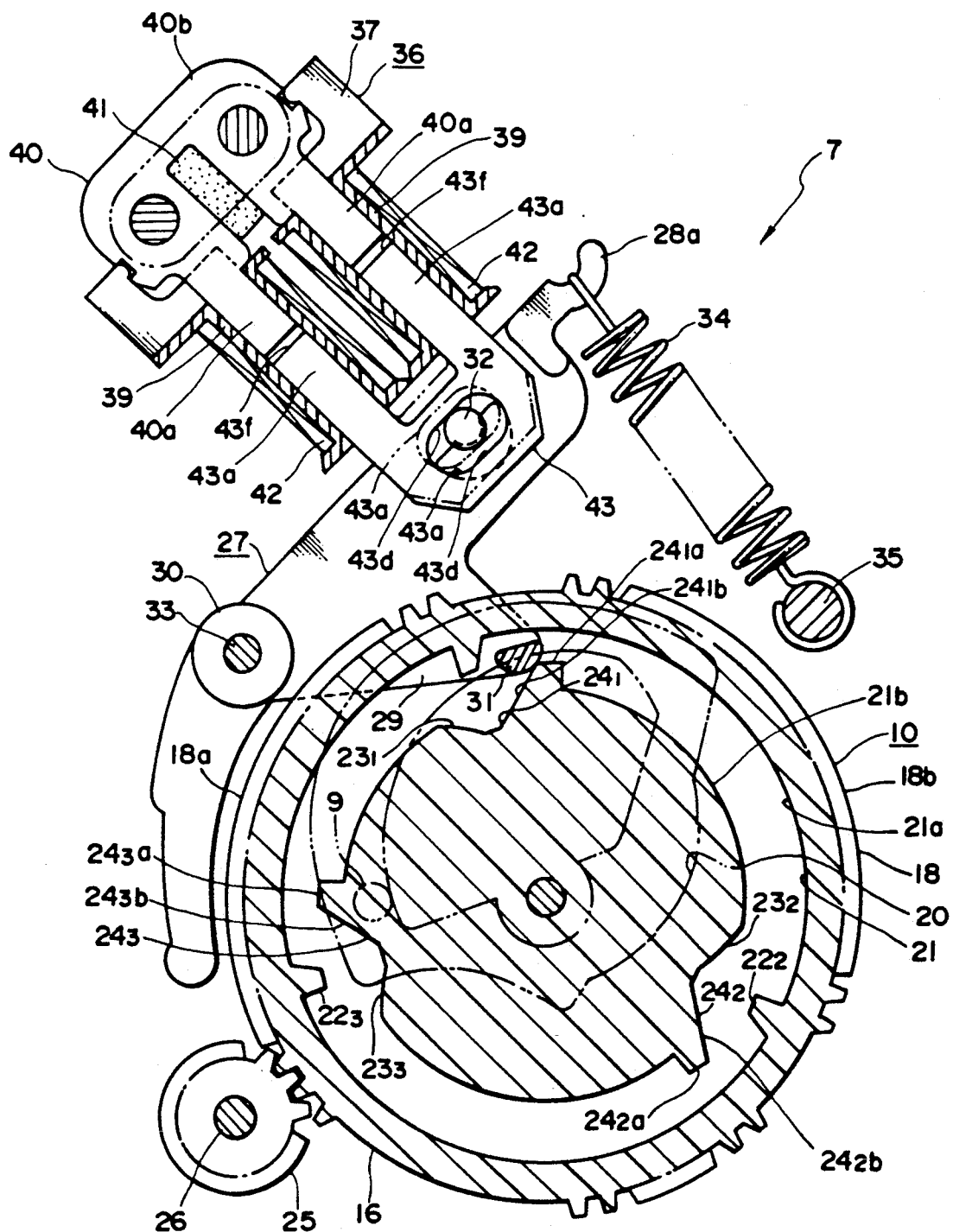

Then, when the trigger lever 27 is pivoted to a position a little before the arresting position as shown in FIG. 2D, attraction end faces 43f of the attraction portions 43a of the movable iron core 43 come close to end faces of the attracting portions 40a of the yoke 40 so that the attracting force of the yoke 40 begins to act upon the movable iron core 43. In this instance, since the connecting pin 32 on the trigger lever 27 contacts with the side face 43d of the connecting hole 43c of the movable iron core 43, the movable iron core 43 is allowed to move toward the yoke 40 by a distance equal to a dimension of a play between the connecting hole 43c and the connecting pin 32, that is, a difference of a dimension of the connecting hole 43c in the direction of movement of the movable iron core 43 and a thickness of the connecting pin 32, and consequently, the movable iron core 43 is moved toward and attracted to the yoke 40 as indicated in phantom in FIG. 2D. Thus, after the movable iron core 43 is pushed by the trigger lever 27 to move to a certain position in the proximity of the yoke 40, it is moved toward the yoke 40 not by the pushing force of the trigger lever 27 but by the attracting force of the yoke 40.

In case the distance between the movable iron core 43 and the yoke 40 when the movable iron core 43 is moved by the attracting force 40 is equal to or smaller than the play between the connecting hole 43c and the connecting pin 32, the movable iron core 43 is brought into contact with and attracted to the yoke 40. On the contrary in case the distance is greater than the play, the movable iron core 43 is first moved toward the yoke 40 to a position at which the side face 43d of the connecting hole 43c thereof is abutted with the connecting pin 32 of the trigger lever 27 and thereafter pivots the trigger lever 27 in the counterclockwise direction to a position in the proximity of the arresting position, whereupon it is brought into contact with and attracted to the yoke 40.

Figure 2E:
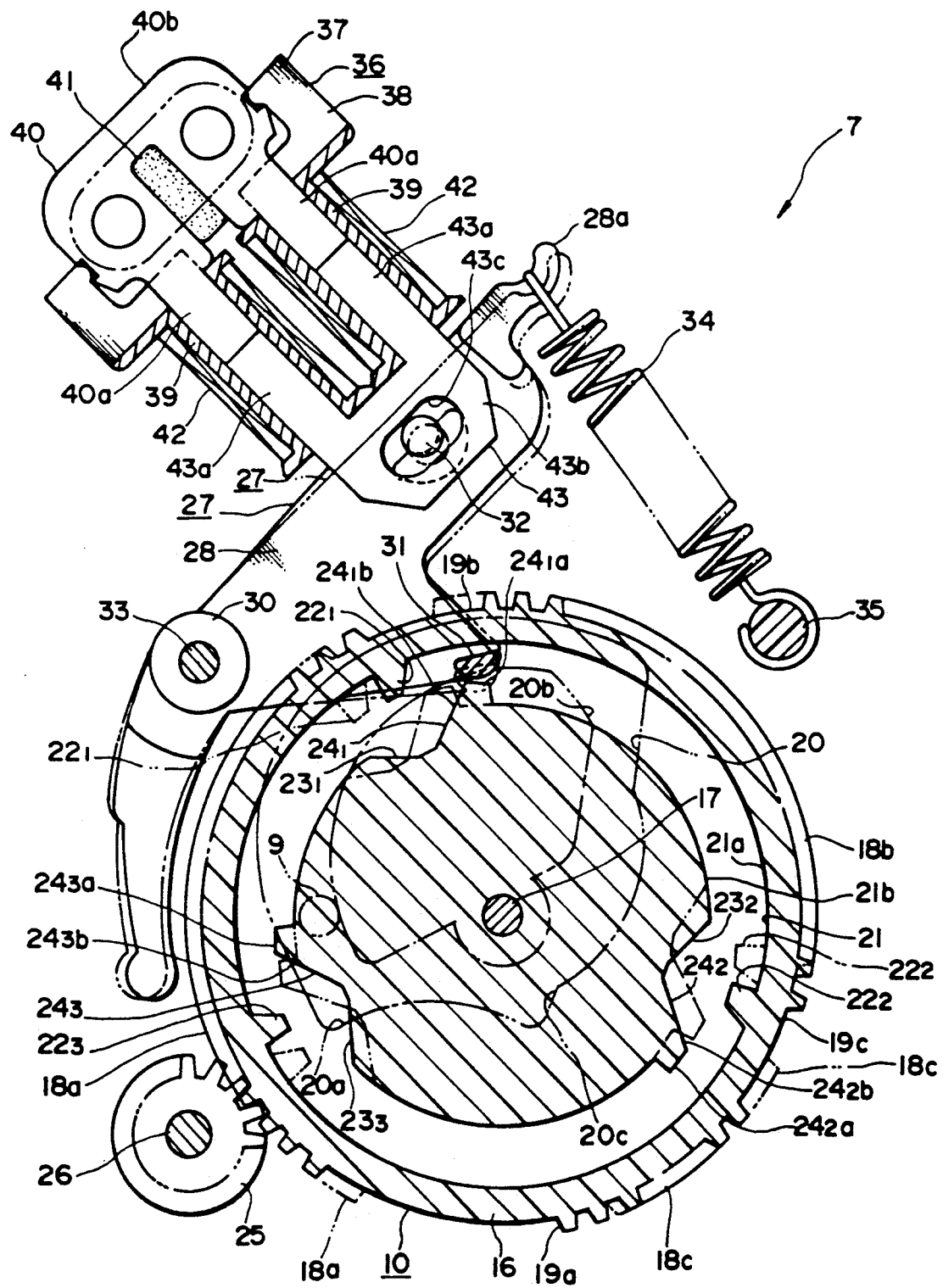

The pressing operation of the trigger lever 27 upon the movable iron core 43 toward the solenoid plunger 36 which is performed by the pushing back face $24_1$ of the cam gear 10 pressing the engaging projection 31 of the trigger lever 27 comes to an end when the engaging projection 31 relatively rides onto the end portion $24_1a$ of the pushing back face $24_1$ as indicated by a solid line in FIG. 2E. In this condition, the trigger lever 27 is at a position displaced a little toward the solenoid plunger 36 past the arresting position, and accordingly, the connecting pin 32 thereon is spaced from both of the side faces 43b and 43d of the connecting hole 43a. This is because, after the movable iron core 43 is fixed in position at a point of time when it is contacted with the yoke 40, only the trigger lever 27 is pivoted so that the connecting pin 32 thereon moves toward the solenoid plunger 26.

Then, after the cam gear 10 is further rotated until the end portion $24_1a$ of the pushing back face $24_1$ thereon is disengaged from the engaging projection 31 of the trigger lever 27, the trigger lever 27 is allowed to be pivoted in the clockwise direction by the tensile force of the tension spring 34 to a position at which the connecting pin 32 thereon is abutted with the side face 43d of the connecting hole 43c. The trigger lever 27 is thereafter held at the position.

Thus, the movable iron core 43 is attracted with certain to the yoke 40, and consequently, the trigger lever 27 is held stably at the arresting position. Then, substantially immediately before the engaging projection 31 on the trigger lever 27 relatively rides onto the end portion $24_1a$ of the pushing back face $24_1$ of the cam gear 10, the movable iron core 43 of the solenoid plunger 36 is attracted to the yoke 40, and immediately after then, the trigger lever 27 comes to the arresting position (refer to FIG. 2E).

Then, when the cam gear 10 is rotated to the second position, the second stopper projection $22_2$ thereon is abutted with the engaging projection 31 of the trigger lever 27 while the second non-toothed portion 19b of the cam bear 10 is opposed to the driving gear 25. Consequently, rotation of the cam gear 10 is stopped at the second position.

Also initial rotation of the cam gear 10 from the second position or the third position and pushing back of the trigger lever 27 to the arresting position and so forth are performed in a similar manner as described above. In particular, initial rotation of the cam gear 10 from the second position is performed as the engaging projection 31 of the trigger lever 27 pushes the second pressure receiving face $23_2$ of the cam gear 10 opposed to the second stopper projection $22_2$, and succeeding pushing back of the trigger lever 27 is performed as the pushing back face $24_2$ presses the engaging projection 31. On the other hand, initial rotation of the cam gear 10 from the third position is performed as the engaging projection 31 presses the pressure receiving face $23_3$ opposed to the third stopper projection $22_3$, and succeeding pushing back of the trigger lever 27 is performed as the pushing back face $24_3$ presses the engaging projection 31.

Figure 10:
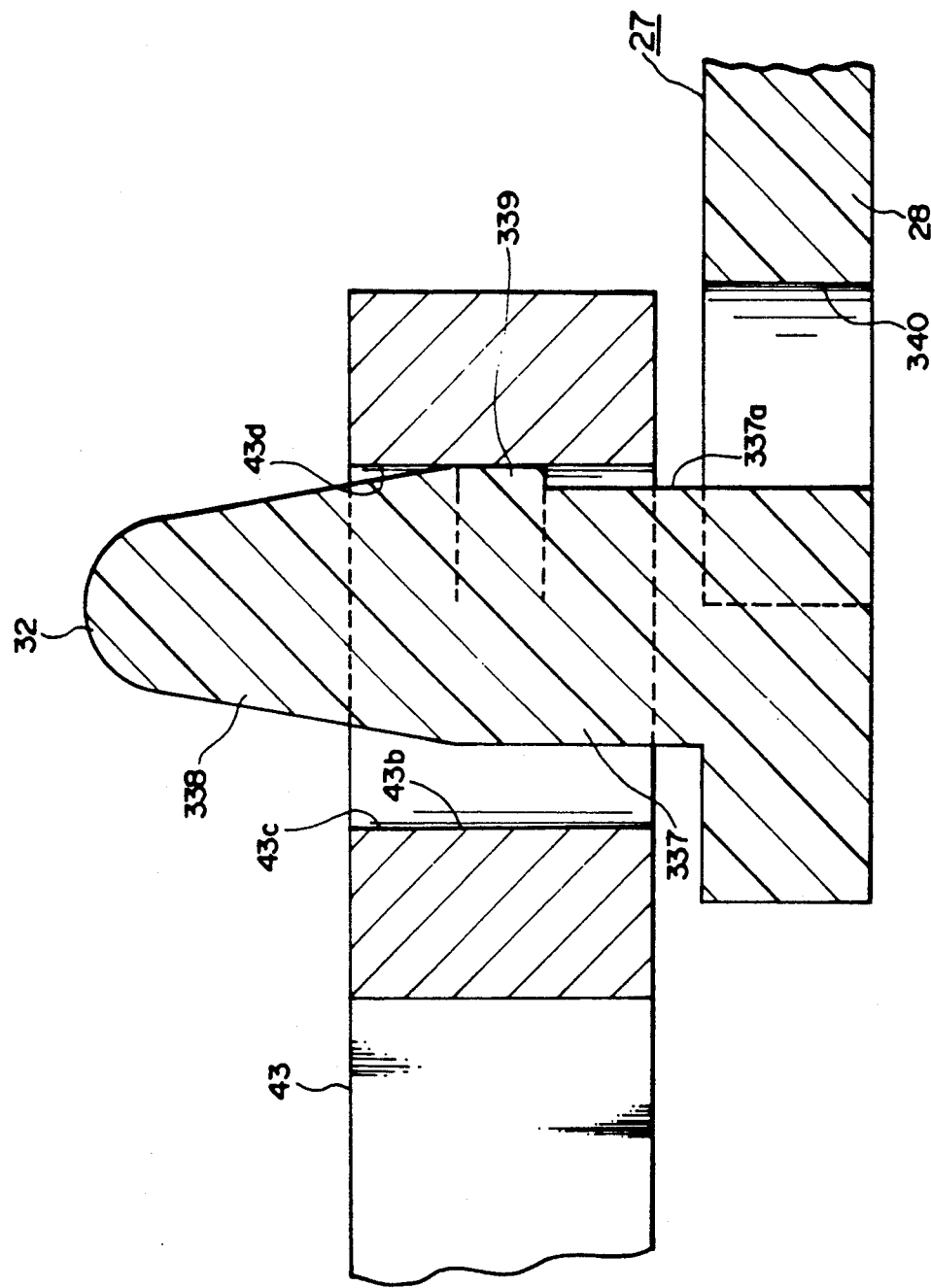
FIG. 10 is an enlarged sectional view showing the trigger lever and a movable iron core of the solenoid plunger of the cam gear controlling mechanism of FIG. 2A.

Referring now to FIG. 10, the connecting pin 32 of the trigger lever 27 and the connecting hole 43c of the movable iron core 43 are shown in detail. The connecting pin 32 formed on the trigger lever 27 is formed as a unitary member together with the remaining portion of the trigger lever 27 and has such a profile as described below.

In particular, a substantially lower half 337 of the connecting pin 32 basically has a round column-like profile and has a height substantially equal to one half the length of the connecting hole 43c while the remaining upper half 338 has a substantially conical profile. A substantially half 337a in a circumferential direction of a portion of the lower half 337 below a location a little displaced downwardly from the upper half 338 is formed with s smaller diameter than the remaining portion and has an outer periphery retracted a little from an outer periphery of the remaining portion toward an axis of the connecting pin 32. The reduced diameter portion 337a retracted toward the axis is provided in a region rightwardly forwards of a straight line passing the axis of the connecting pin 32 and extending in a longitudinal direction of the main portion 28 of the trigger lever 27.

Accordingly, a projected portion 339 of the outer periphery of the connecting pin 32 between the reduced diameter portion 337a and the upper half 338 has a greatest diameter among all portions of the outer periphery which are directed substantially rightwardly forwards, and the axial length of the projected portion 339 is set to one fourth or so of the length of the connecting hole 43c.

It is to be noted that a semicircular hole 340 formed at a location of the main portion 28 of the trigger lever 27 corresponding to the reduced diameter portion 337a is provided to permit molding of the reduced diameter portion 337a.

Thus, if the connecting pin 32 having such construction is inserted into the connecting hole 43c formed in the movable iron core 43, the projected portion 339 thereon is positioned at a same height as an intermediate portion of the direction of the length of the connecting hole 43c such that it is opposed to the side face 43d of the connecting hole 43c.

Thus, when the trigger lever 27 is moved from the arresting position to the non-arresting position or when the position of the trigger lever 27 is controlled by the movable iron core 43, the force of the connecting pin 32 pressing the movable iron core 43 is applied only to the intermediate portion of the side face 43d of the connecting hole 43c in the direction of the length, that is, only to an intermediate location in the thicknesswise direction of the movable iron core 43.

Accordingly, even if the axis of the connecting pin 32 and the inner face 43d of the connecting hole 43c do not extend in parallel to each other or even if the direction of the force of the connecting pin 32 pressing the inner face 43d of the connecting hole 43c is inclined a little with respect to the direction of movement of the movable iron core 43, a moment including a component which acts in a vertical direction on the movable iron core 43 is little caused by a force of the projected portion 339 pressing the side face 43d of the connecting hole 43c. Accordingly, no pinch will take place between the attraction portions 43a of the movable iron core 43 and the coil bobbins 36, and little loss will take place with the force of the trigger lever 27 pressing the movable iron core 43. Consequently, smooth movement of the movable iron core 43 and the trigger lever 27 is assured. Further, the fact that no angular moment in a vertical direction takes place with the movable iron core 43 when the movable iron core 43 is pressed by the trigger lever 27 assures that attraction of the movable iron core 43 to the yoke 40 is performed in a condition wherein the attracted faces 43a of the movable iron core 43 and the end faces of the attracting portions 40a of the yoke 40 completely closely contact with each other, and accordingly, the condition wherein the movable iron core 43 is attracted to the yoke 40 is held very stably. Consequently, the trigger lever 27 is held stably at the arresting position.

Having now fully described the invention, it will be apparent to one of ordinary skill in the art that many changes and modifications can be made thereto without departing from the spirit and scope of the invention as set forth herein.

What is claimed is:

1. A cam gear controlling mechanism, comprising:
   a cam gear having a plurality of alternate toothed and non-toothed portions, a controlling cam portion having a required mode-changing controlling function, and means rigidly connected to and coaxial with said controlling cam portion and defining a cam groove, said cam groove being separate from said controlling cam portion and including a first cam face formed on a first side of said cam groove on which a plurality of stopper projections are formed and a second cam face on which a plurality of pressure receiving faces and pushing back faces are formed in pair individually in a substantially opposing relationship to said stopper projections, said second cam face being formed on a second side of said cam groove opposite said first side;
   a trigger lever having an engaging projection fitted in said cam groove and movable between an arresting position at which said engaging projection is positioned on a locus of movement of said stopper projections upon rotation of said cam gear and a non-arresting position at which said engaging projection is outside the locus of movement of said stopper projections;
   spring means for biasing said trigger lever to the non-arresting position; and
   electromagnetic means for releasably holding said trigger lever at the arresting position;
   wherein said cam gear is rotated in one direction when any of said toothed portions thereof is brought into engagement with a driving gear, but when said driving gear is opposed to any of said non-toothed portions, one of said stopper projections is abutted with said engaging projection to lock said cam gear at the position; and
   when holding of said trigger lever at the arresting position is cancelled while said cam gear is in a locked condition, said trigger lever is moved to the non-arresting position to cancel locking of said cam gear while said engaging projection thereon presses one of said pressure receiving faces to rotate said cam gear to a position at which one of said toothed portions is engaged with said driving gear, whereafter one of said pushing back faces paired with the one pressure receiving face presses said engaging projection to return said trigger lever to the arresting position.

2. A cam gear controlling mechanism, comprising:
   a cam gear having a plurality of alternate toothed and non-toothed portions, a controlling cam portion having a required controlling function, and means defining a cam groove including a first cam face on which a plurality of stopper projections are formed and a second cam face on which a plurality of pressure receiving faces and pushing back faces are formed in pair individually in a substantially opposing relationship to said stopper projections;
   a trigger lever having an engaging projection fitted in said cam groove and movable between an arresting position at which said engaging projection is positioned on a locus of movement of said stopper projections upon rotation of said cam gear and a non-arresting position at which said engaging projection is outside the locus of movement of said stopper projections;
   spring means for biasing said trigger lever to the non-arresting position; and
   electromagnetic means for releasable holding said trigger lever at the arresting position;
   wherein said cam gear is rotated in one direction when any of said toothed portions thereof is brought into engagement with a driving gear, but when said driving gear is opposed to any of said non-toothed portions, one of said stopper projections is abutted with said engaging projection to lock said cam gear at the position; and
   when holding of said trigger lever at the arresting position is cancelled while said cam gear is in a locked condition, said trigger lever is moved to the non-arresting position to cancel locking of said cam gear while said engaging projection thereon presses one of said pressure receiving faces to rotate said cam gear to a position at which one of said toothed portions is engaged with said driving gear, whereafter one of said pushing back faces paired with the one pressure receiving face presses said engaging projection to return said trigger lever to the arresting position;
   wherein said electromagnetic means includes a magnetic and a solenoid plunger of the self holding type having a movable iron core slidably movable toward and away from said magnet, one of said movable iron core and said trigger lever having a connecting projection formed thereon while the other has a connecting hole formed therein in which said connecting projection is fitted to connect said movable iron core and said trigger lever to each other, said connecting hole having a dimension in the direction of movement of said movable iron core greater than the thickness of said connecting projection such that said iron core may be attached to said magnet after said movable iron core is pressed by said trigger lever to move to a position in the proximity of said magnet.

3. A cam gear controlling mechanism, comprising:
   a cam gear having a plurality of alternate toothed and non-toothed portions, a controlling cam portion having a required controlling function, and means defining a cam groove including a first cam face on which a plurality of stopper projections are formed and a second cam face on which a plurality of pressure receiving faces and pushing back faces are formed in pair individually in a substantially opposing relationship to said stopper projections;

a trigger lever having an engaging projection fitted in said cam groove and movable between an arresting position at which said engaging projection is positioned on a locus of movement of said stopper projections upon rotation of said cam gear and a non-arresting position at which said engaging projection is outside the locus of movement of said stopper projections;

spring means for biasing said trigger lever to the non-arresting position; and electromagnetic means for releasable holding said trigger lever at the arresting position;

wherein said cam gear is rotated in one direction when any of said toothed portions thereof is brought into engagement with a driving gear, but when said driving gear is opposed to any of said non-toothed portions, one of said stopper projections is abutted with said engaging projection to lock said cam gear at the position; and when holding of said trigger lever at the arresting position is cancelled while said cam gear is in a locked condition, said trigger lever is moved to the non-arresting position to cancel locking of said cam gear while said engaging projection thereon presses one of said pressure receiving faces to rotate said cam gear to a position at which one of said toothed portions is engaged with said driving gear, whereafter one of said pushing back faces paired with the one pressure receiving face presses said engaging projection to return said trigger lever to the arresting position;

wherein a connecting pin is provided on said trigger lever and fitted in a connecting hole formed in a movable element of said electromagnetic means to connect said movable element and said trigger lever to each other, and a projected portion is formed at a location of said connecting pin opposing to an intermediate portion of said connecting hole in a direction of the length of said connecting hole os as to contact with an inner face of said connecting hole.

* * * * *